(12) United States Patent
Upshall

(10) Patent No.: US 8,733,431 B2
(45) Date of Patent: May 27, 2014

(54) METHOD AND SYSTEM OF TRANSMITTING ELECTROMAGNETIC WAVES FROM A WELLBORE

(75) Inventor: Malcolm Upshall, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 713 days.

(21) Appl. No.: 12/933,534

(22) PCT Filed: Jun. 10, 2008

(86) PCT No.: PCT/US2008/066410
§ 371 (c)(1),
(2), (4) Date: Sep. 20, 2010

(87) PCT Pub. No.: WO2009/151444
PCT Pub. Date: Dec. 17, 2009

(65) Prior Publication Data
US 2011/0030946 A1 Feb. 10, 2011

(51) Int. Cl.
*E21B 43/00* (2006.01)
(52) U.S. Cl.
USPC .......................................... 166/65.1; 175/40
(58) Field of Classification Search
USPC .................. 166/65.1, 248; 175/40, 41, 45
See application file for complete search history.

(56) References Cited

U.S. PATENT DOCUMENTS

| | | | |
|---|---|---|---|
| 5,394,141 A | 2/1995 | Soulier | |
| 5,676,212 A | 10/1997 | Kuckes | |
| 6,469,635 B1 * | 10/2002 | Hudson | 340/854.4 |
| 6,820,693 B2 | 11/2004 | Hales | |
| 7,145,473 B2 | 12/2006 | Wisler | |
| 7,252,160 B2 | 8/2007 | Dopf et al. | |
| 2005/0056419 A1 | 3/2005 | Hosie | |
| 2007/0102197 A1 * | 5/2007 | Rotthaeuser | 175/320 |

OTHER PUBLICATIONS

International Search Report and Written Opinion for PCT Application No. PCT/US08/066410, filed Jun. 10, 2008.

* cited by examiner

*Primary Examiner* — Brad Harcourt
(74) *Attorney, Agent, or Firm* — Mark E. Scott; Conley Rose, P.C.

(57) ABSTRACT

A method and system for transmitting electromagnetic waves from a wellbore. At least some of the illustrative embodiments are systems comprising production tubing in a wellbore, the production tubing extends beyond a casing in the wellbore, and the production tubing beyond the casing comprises a first conductive portion, and a second conductive portion mechanically coupled to and electrically isolated from the first conductive portion.

21 Claims, 6 Drawing Sheets

METHOD AND SYSTEM OF TRANSMITTING ELECTROMAGNETIC WAVES FROM A WELLBORE

This application claims the benefit of PCT application serial number PCT/US2008/066410, filed Jun. 10, 2008, titled "Method and System of Transmitting Electromagnetic Waves From a Wellbore", and which application is incorporated by reference as if reproduced in full below.

BACKGROUND

Modern oil field operations demand a great quantity of information relating to the parameters and conditions encountered downhole. Such information includes characteristics of the earth formations throughout the wellbore, and data relating to the size, direction and configuration of the wellbore. The collection of information relating to conditions downhole is performed by several methods including wireline, measuring-while-drilling (MWD) and logging-while-drilling (LWD).

In wireline, a probe or "sonde" is lowered into the wellbore after some or all of a well has been drilled. The sonde hangs at the end of a long cable or "wireline" that provides mechanical support to the sonde and also provides an electrical connection between the sonde and electrical equipment located at the surface of the well. Various parameters of the borehole and/or the earth's formations are measured and correlated with the position of the sonde in the wellbore as the sonde is pulled uphole.

In MWD and LWD, the drilling assembly includes sensing instruments that measure various parameters as the formation is being drilled. These while-drilling techniques transmit to the surface real-time information relating to the conditions downhole, and as such allow for an immediate response to wellbore conditions. Various telemetry techniques are used to transmit the information to surface, such as mud pulse telemetry.

BRIEF DESCRIPTION OF THE DRAWINGS

For a detailed description of the various embodiments, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the term "comprising" is used in an open-ended fashion, and thus should be interpreted to mean "comprising, but not limited to . . . ". Also, the terms "couple" or "couples" are intended to mean either an indirect or direct electrical or mechanical connection, as the context may require. Thus, if a first device couples to a second device, that connection may be through a direct connection, or through an indirect connection via other devices and connections.

DETAILED DESCRIPTION

Figure 1:
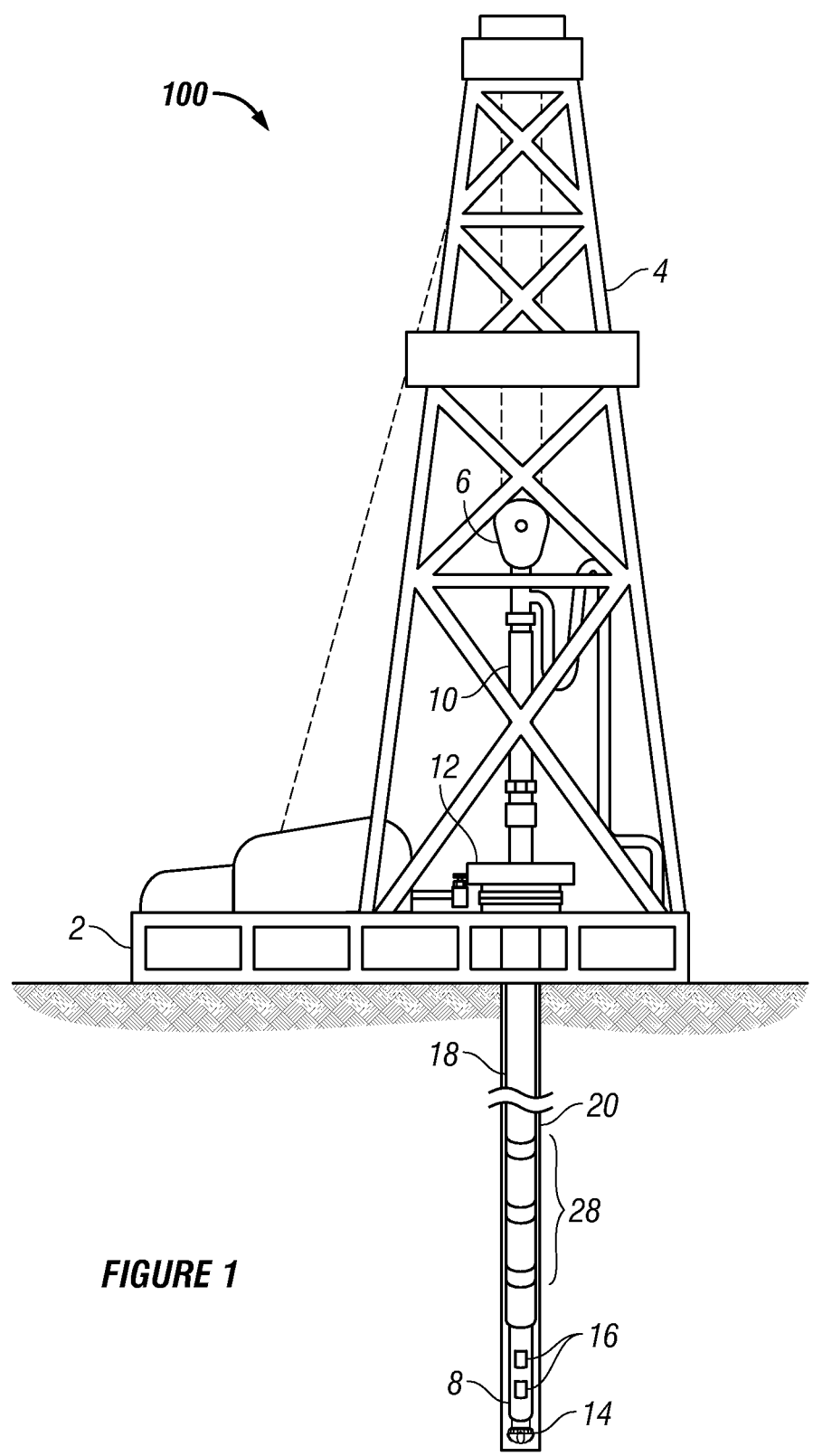
FIG. 1 shows a drilling system in accordance with some of the embodiments.

FIG. 1 illustrates a drilling system 100 in which a drilling platform 2 is equipped with a derrick 4 that supports a hoist 6. The hoist suspends a Kelly 10 that is used to lower the casing 18 through rotary table 12. Connected to the lower end of the casing 18 is a drill collar 8 and a drill bit 14. The drill bit 14 is rotated by rotating the casing 18 or by operating a downhole motor near the drill bit 14. Placing of casing 18 in a wellbore while drilling is referred to as casing-while-drilling (CWD).

In addition to casing-while-drilling, the various embodiments may also utilize measuring-while-drilling (MWD) and logging-while-drilling (LWD) technologies. While there may be distinctions between MWD and LWD, the terms are used often interchangeably. The balance of this specification will be described in reference to LWD systems; however, it will be understood that the term LWD comprises MWD for purposes of this specification.

Still referring to FIG. 1, the drill collar 8 comprises one or more sensors 16 to obtain information relating to wellbore 20 conditions and/or information related to the formation surrounding the wellbore 20. At least some of the information gathered by the LWD operation is transmitted to the surface in the form of electromagnetic waves. In accordance with at least some embodiments, the antenna for transmitting the electromagnetic waves is formed by the casing 18 itself. In the illustrative case of FIG. 1, the antenna 28 formed by the casing 18 is the antenna with which electromagnetic waves are sent to the surface. The antenna 28 is an electric dipole antenna (e.g., a half-wave electric dipole antenna).

Figure 2:
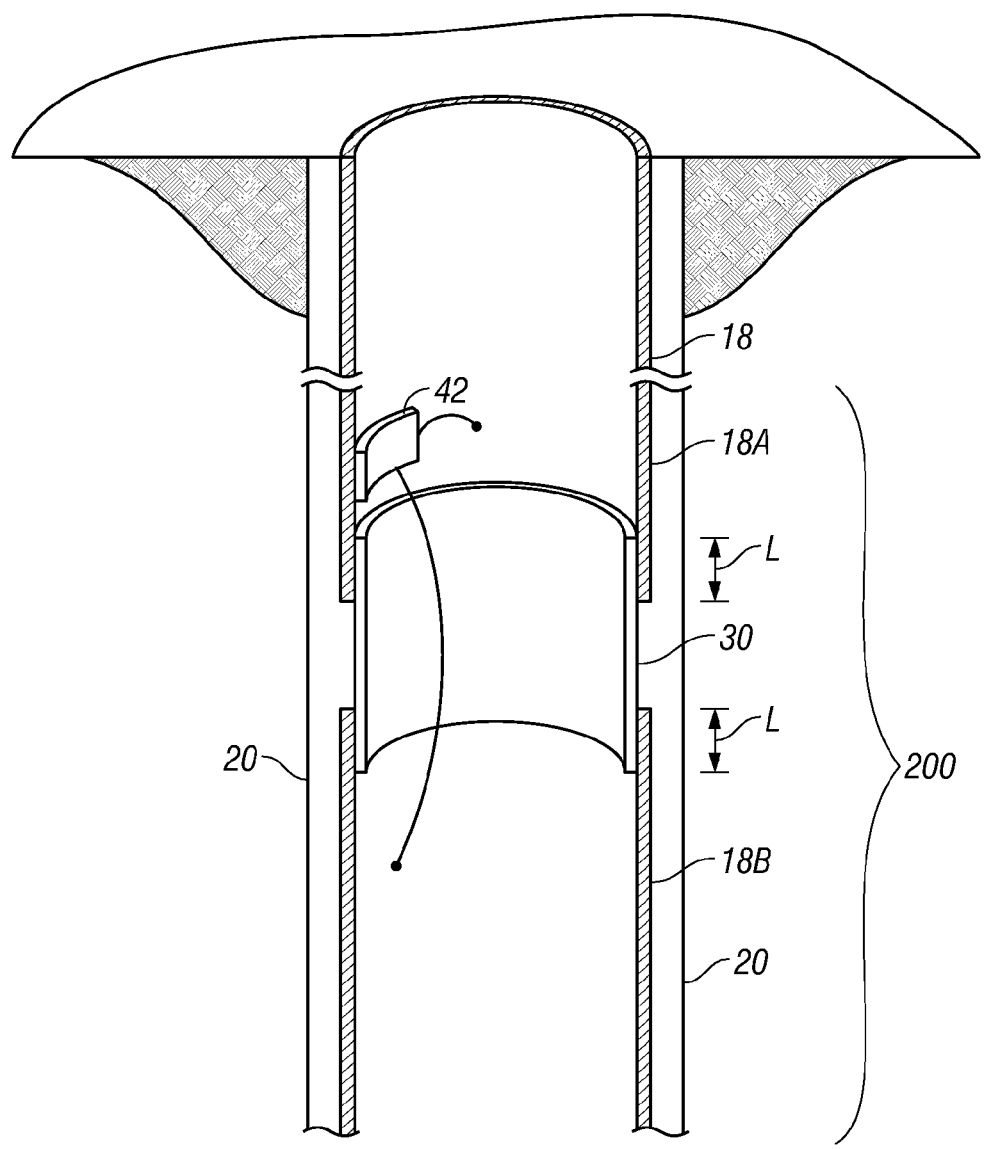
FIG. 2 shows an antenna structure in accordance with at least some of the embodiments.

FIG. 2 illustrates a perspective, cross-section view of an antenna structure 200 in the wellbore 20 in accordance with at least some of the embodiments. The antenna structure 200 is similar to the antenna 28 of FIG. 1. In particular, the antenna structure 200 comprises a first conductive portion 18A of the casing 18, a mandrel 30 and a second conductive portion 18B of the casing 18. The first conductive portion 18A and the second conductive portion 18B are comprised of material such as steel, or any other electrically conducting material which may be used for casing 18 and/or casing-while-drilling the wellbore 20. The mandrel 30 is disposed between the first conductive portion 18A and the second conductive portion 18B. In the illustrated embodiment, the mandrel 30 is connected to the first conductive portion 18A and the second conductive portion 18B by way of a friction fit. The mandrel 30 overlaps the first conductive portion 18A by length 'L', and the mandrel 30 overlaps the second conductive portion 18B by length 'L'. In at least some embodiments, 'L' is at least one foot. In other embodiments the mandrel 30 may be threadingly connected to the first conductive portion 18A and the second conductive portion 18B.

In at least some embodiments, the mandrel 30 comprises a non-conductive material (e.g., hardened plastics, ceramics). In other embodiments, the mandrel 30 comprises a conductive material with a non-conductive coating. The non-conductive coating may be materials such as composite polymers, ceramic oxides and epoxies. In accordance with the antenna structure 200 illustrated in FIG. 2, the mandrel 30 disposed between the first conductive portion 18A and the second conductive portion 18B electrically isolates the first conductive portion 18A from the second conductive portion 18B.

Stated otherwise, the mandrel 30 creates an electrical open or a very high resistance connection between the first conductive portion 18A and the second conductive portion 18B. Energizing the first conductive portion 18A and the second conductive portion 18B with currents of opposite electrical polarities creates an electric dipole antenna which may transmit electromagnetic waves.

In at least some embodiments, electronics 42 electrically coupled to the first conductive portion 18A and the second conductive portion 18B provide the current to energize the first conductive portion 18A and the second conductive portion 18B with opposite electrical polarities. Although, in the illustrated embodiments, the electronics 42 are mechanically coupled to the first conductive portion 18A, the electronics 42 may be mechanically coupled to the mandrel 30 or the second conductive portion 18B. In at least some embodiments, the electronics 42 are proximate to (i.e., within two feet) the interface of the first conductive portion 18A and the second conductive portion 18B. The electronics 42 may comprise electronic devices such as a modulator, a microprocessor, memory and amplifiers. The electronics 42 may be powered by a battery pack to provide proper operating voltage and current or powered by wires from the surface. In at least some embodiments, the electronics 42 use information relating to the conditions in the wellbore 20 to modulate a carrier when creating antenna feed signal. The antenna feed signals are fed to the antenna structure 200 comprising the first conductive portion 18A, the mandrel 20 and the second conductive portion 18B, which creates a corresponding electromagnetic wave. In other embodiments, the antenna structure 200 receives electromagnetic waves (e.g., from an antenna lower in the wellbore) and the electronics 42 re-transmit the information (i.e., act as a repeater).

Figure 3:
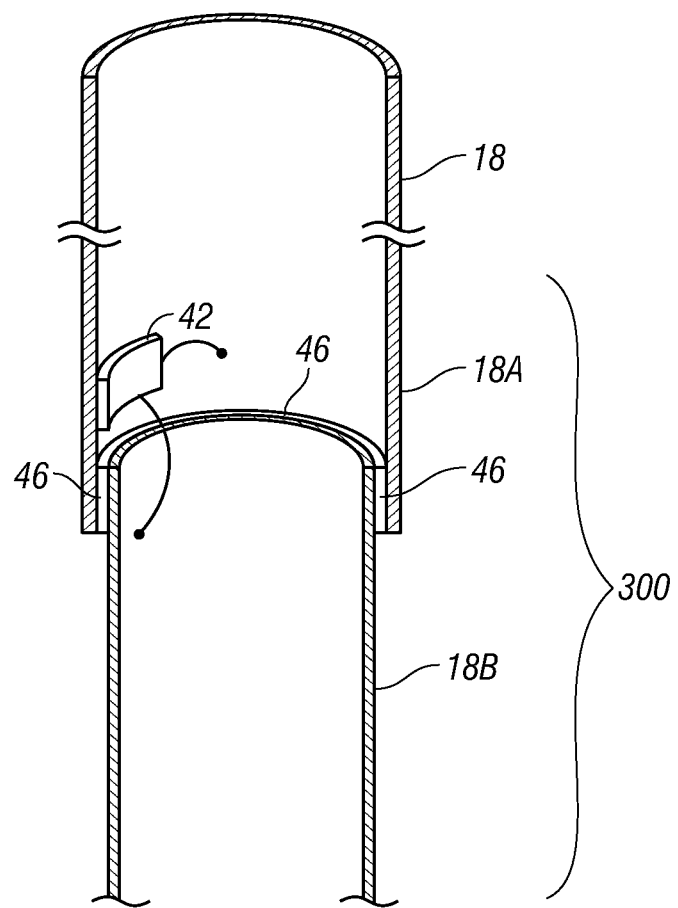
FIG. 3 shows an alternative antenna structure in accordance with at least some of the embodiments.

FIG. 3 illustrates a perspective, cross-section view of an alternative antenna structure 300 in accordance with some embodiments. In particular, the antenna structure 300 comprises the first conductive portion 18A, the second conductive portion 18B and an electrically insulating material 46. The second conductive portion 18B is telescoped within first conductive portion 18A, and the electrically insulating material is disposed between the interface or the overlap of the first conductive portion 18A over the second conductive portion 18B. Thus, the embodiments illustrated in FIG. 3 are not required to have a mandrel to electrically isolate the first and second conductive portions. In other embodiments, the end section of the first conductive portion 18A is threadingly connected to the end section of the second conductive portion 18, and the electrically insulating material is disposed between the outer threads of the end section of the second conductive portion 18B and the inner threads of the end section of the first conductive portion 18A.

The electrically insulating material 46 comprises materials such as composite polymers, ceramic oxides and epoxies. The electrically insulating material 46 electrically isolates the first conductive portion 18A from the second conductive portion 18B. In illustrative embodiments of FIG. 3, the electronics 42 are mechanically coupled to the first conductive portion 18A, however, the electronics 42 may likewise be mechanically coupled to the second conductive portion 18B. The electronics 42 are proximate to (i.e., within two feet) the interface of the first conductive portion 18A and the second conductive portion 18B. The electronics 42 electrically couple to the first conductive portion 18A and the second conductive portion 18B to provide the current to energize the first conductive portion 18A and the second conductive portion 18B with opposite electrical polarities creating an electric dipole of the casing 18.

Figure 4:
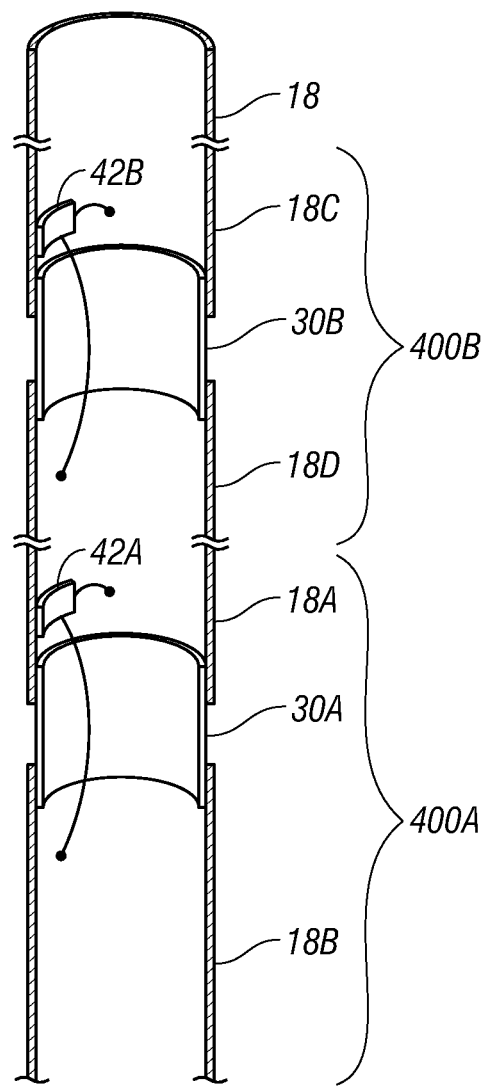
FIG. 4 shows the antenna structure acting as a repeater in accordance with at least some embodiments.

FIG. 4 illustrates a perspective, cross-section view of the casing 18 with two antenna structures 400A-400B spaced along the casing 18. The antenna structure 400A comprises the first conductive portion 18A, the second conductive portion 18B and the mandrel 30A. The electronics 42A are mechanically coupled to the first conductive portion 18A and proximate to the interface of the first conductive portion 18A and the second conductive portion 18B. The electronics 42A provide the current to energize the first conductive portion 18A and the second conductive portion 18B creating a first electric dipole. In the embodiments of FIG. 4, a second antenna structure 400B is also present. The antenna structure 400B may be configured to act as a repeater and the antenna structure 400B comprises the first conductive portion 18C, the second conductive portion 18D and the mandrel 30B. Electronics 42B are mechanically coupled to the first conductive portion 18C and proximate to the interface of the first conductive portion 18C and the second conductive portion 18D. The antenna structure 400B receives the electromagnetic waves transmitted by the antenna structure 400A. The electronics 42B amplify the electromagnetic waves, and the electronics 42B feed the amplified electromagnetic waves to the antenna structure 400B to transmit the electromagnetic waves to the surface. Although, FIG. 4 illustrates a single antenna structure 400B acting as a repeater, any number of antenna structures may be spaced along the casing 18 to act as repeaters. The number of repeaters and the distance between the repeaters is determined by the depth of the wellbore. FIG. 4 illustrates the antenna structures 400A-400B comprising a mandrel 30A-30B, however the antenna structure as illustrated in FIG. 3 may alternatively be used for the antenna structures 400A-400B.

Figure 5:
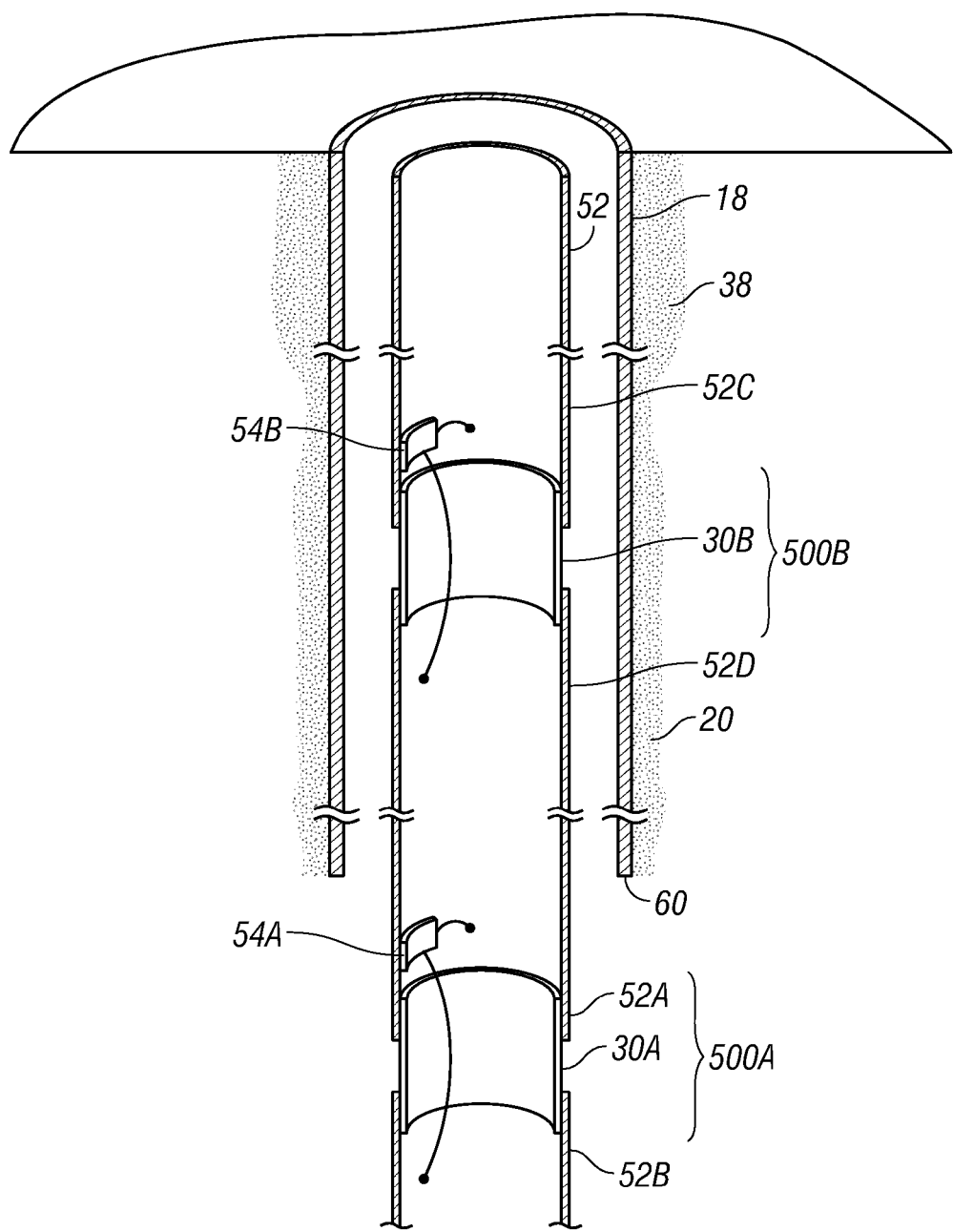
FIG. 5 shows a cased borehole comprising production tubing with the antenna structure.

FIG. 5 illustrates a perspective, cross-section view of an alternative embodiments comprising a cased wellbore having production tubing 52 therein. In the cased wellbore the casing-while-drilling operation has completed, and the casing is cemented in place. In particular, FIG. 5 illustrates the casing 18 within the wellbore 20, and the casing 18 comprises cement 38 between its outer diameter and the wellbore 20. In the embodiments of FIG. 5, the production tubing extends beyond the lower portion 60 of the casing 18. The production tubing 52 is of smaller diameter than the casing 18, and the production tubing 52 is the route by which at least some of the hydrocarbons extracted from the formation are conveyed to the surface. The production tubing 52 comprises an antenna structure 500A located beyond the casing 18, the antenna structure 500A comprising a first conductive portion 52A, a second conductive portion 52B and a mandrel 30A. Electronics 54A are mechanically coupled to the first conductive portion 52A and proximate to the interface of the first conductive portion 52A and the second conductive portion 52B. The electronics 54A provide the current to energize the first conductive portion 52A and the second conductive portion 52B creating an electric dipole to transmit electromagnetic waves. In some embodiments, the antenna structure 500A transmits electromagnetic waves to the surface. In alternative embodiments, the production tubing 52 comprises a second antenna structure 500B spaced apart from the antenna structure 500A to act as a repeater for electromagnetic waves transmitted from antenna structure 500A. The antenna structure 500B is located within the casing 18, and the antenna structure 500B comprises a first conductive portion 52C, a second conductive portion 52D and a mandrel 30B. Electronics 54B are mechanically coupled to the first conductive portion 52C and proximate to the interface of the first conductive portion 52C and the second conductive portion 52D. The antenna structure 500B receives the electromagnetic waves transmitted from the antenna structure 500A, and the antenna structure 500B re-transmits the received electromagnetic waves to the surface. Although, FIG. 5 illustrates a single antenna structure 500B acting as a repeater, it should be noted that any number of antenna structures may be spaced along the production tubing 52 and/or casing 18 to act as repeaters. Further still, the dipole antennas for the repeater portions of the system may be placed on the casing 18 as discussed above. Stated otherwise, the primary electromagnetic signal may be transmitted from the an electric dipole antenna composed of portions of the production tubing 52, and the electromagnetic signal may be received and retransmitted by electric dipole antennas formed from the casing 18. The number of repeaters and the distance between the repeaters is determined by the depth of the wellbore. FIG. 5 illustrates the antenna structures 500A-500B comprising a mandrel 30A-30B, however the antenna structure as illustrated in FIG. 3 may alternatively be used for antenna structures 500A-500B.

Figure 6:
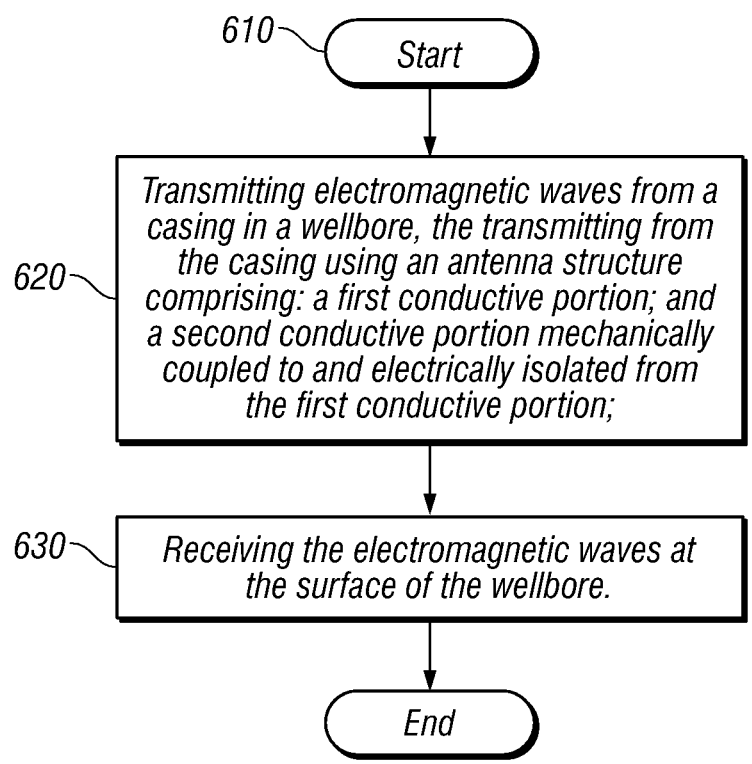
FIG. 6 shows a method in accordance with at least some of the embodiments.

FIG. 6 shows a method in accordance with at least some embodiments. In particular, method starts (block 610) and proceeds to transmitting electromagnetic waves from a casing in a wellbore, the transmitting from the casing using an antenna structure comprising a first conductive portion and a second conductive portion mechanically coupled to and electrically isolated from the first conductive portion (block 620). In some embodiments, a mandrel is disposed between the first conductive portion and the second conductive portion, and the mandrel electrically isolates the first conductive portion from the second conductive portion. Next, the electromagnetic waves are received at the surface of the wellbore (block 630). The method then ends (block 440).

The above discussion is meant to be illustrative of the principles and various embodiments of the present invention. Numerous variations and modifications will become apparent to those skilled in the art once the above disclosure is fully appreciated. For example, the antenna structure 200 as illustrated in FIG. 2 may reduce current return and reduce the error associated with current return in magnetic ranging. It is intended that the following claims be interpreted to embrace all such variations and modifications.

What is claimed is:

1. A system comprising:
   production tubing in a wellbore, the production tubing extends beyond a casing in the wellbore, and the production tubing beyond the casing comprises:
      a first conductive portion; and
      a second conductive portion mechanically coupled to and electrically isolated from the first conductive portion;
   electronics electrically coupled to the first conductive portion and the second conductive portion, the electronics transmit an electromagnetic wave from a first antenna structure comprising the first conductive portion and the second conductive portion; and
   a second antenna structure on the production tubing above the first antenna structure, the second antenna structure receives and re-transmits the electromagnetic wave transmitted from the first antenna structure.

2. The system as defined in claim 1 further comprising a mandrel disposed between the first conductive portion and the second conductive portion, and the mandrel electrically isolates the first conductive portion from the second conductive portion.

3. The system as defined in claim 1 wherein the electronics are mechanically coupled and proximate to an interface of the first conductive portion and the second conductive portion.

4. The system as defined in claim 2 wherein the mandrel comprises a non-conductive material.

5. The system as defined in claim 2 wherein the mandrel comprise a conductive material with a non-conductive coating.

6. The system as defined in claim 5 wherein the non-conductive coating is at least one selected from the group consisting of: composite polymers; ceramic oxides; and epoxies.

7. A system comprising:
   production tubing in a wellbore, the production tubing extends beyond a
      casing in the wellbore, and the production tubing beyond the casing comprises:
      a first conductive portion; and
      a second conductive portion mechanically coupled to and electrically isolated from the first conductive portion;
      a mandrel disposed between the first conductive portion and the second conductive portion, and the mandrel electrically isolates the first conductive portion from the second conductive portion;
      wherein the mandrel is friction fit with the first conductive portion, and the mandrel is friction fit with the second conductive portion;
   electronics electrically coupled to the first conductive portion and the second conductive portion, the electronics transmit an electromagnetic wave from a first antenna structure comprising the first conductive portion and the second conductive portion.

8. The system as defined in claim 7 wherein the mandrel overlaps the first conductive portion by at least one foot, and the mandrel overlaps the second conductive portion by at least one foot.

9. A system comprising:
   production tubing in a wellbore, the production tubing extends beyond a casing in the wellbore, and the production tubing beyond the casing comprises:
      a first conductive portion; and
      a second conductive portion mechanically coupled to and electrically isolated from the first conductive portion;
      said second first conductive portion telescoped within the first conductive portion, and an electrically insulating material disposed between the first and second conductive portions;
   electronics electrically coupled to the first conductive portion and the second conductive portion, the electronics transmit an electromagnetic wave from a first antenna structure comprising the first conductive portion and the second conductive portion.

10. The system as defined in claim 9 wherein the electronics are mechanically coupled and proximate to an interface of the first conductive portion and the second conductive portion.

11. An electromagnetic telemetry system comprising:
   casing within a wellbore, the casing comprising:
      a first antenna structure comprising:
         a first conductive portion;
         a second conductive portion;
         an electrically insulating material disposed between an end section of the of the first conductive portion and an end section of the second conductive portion;
      electronics electrically coupled to the first conductive portion and electrically coupled to the second conductive portion, the electronics transmit an electromagnetic wave from the first antenna structure;

a second antenna structure, the second antenna structure receives and re-transmits the electromagnetic wave transmitted from the first antenna structure.

12. The system as defined in claim 11 wherein the electronics transmit electromagnetic waves from the casing while drilling in a casing-while-drilling system.

13. The system as defined in claim 11 wherein the electrically insulating material is at least one selected from the group consisting of: composite polymers; ceramic oxides; and epoxies.

14. The system as defined in claim 11 wherein the casing further comprises a mandrel, the mandrel disposed between the first conductive portion and the second conductive portion, and the mandrel electrically isolates the first conductive portion and the first conductive portion.

15. The system as defined in claim 14 wherein the mandrel comprises a non-conductive material.

16. The system as defined in claim 14 wherein the mandrel comprises a conductive material with a non-conductive coating.

17. The system as defined in claim 16 wherein the non-conductive coating is at least one selected from the group consisting of: composite polymers; ceramic oxides; and epoxies.

18. An electromagnetic telemetry system comprising:
casing within a wellbore, the casing comprising:
a first antenna structure comprising:
a first conductive portion;
a second conductive portion;
an electrically insulating material disposed between an end section of the of the first conductive portion and an end section of the second conductive portion;
wherein the end section of the first conductive portion and the end section of the second conductive portion overlap each other by at least one foot;
electronics electrically coupled to the first conductive portion and electrically coupled to the second conductive portion, the electronics transmit an electromagnetic wave from the first antenna structure;
a second antenna structure, the second antenna structure receives and re-transmits the electromagnetic wave transmitted from the first antenna structure.

19. The system as defined in claim 18 wherein the electronics are mechanically coupled and proximate to an interface of the first conductive portion and the second conductive portion.

20. An electromagnetic telemetry system comprising:
casing within a wellbore, the casing comprising:
a first antenna structure comprising:
a first conductive portion;
a second conductive portion;
an electrically insulating material disposed between an end section of the of the first conductive portion and an end section of the second conductive portion;
a mandrel, the mandrel disposed between the first conductive portion and the second conductive portion, and the mandrel electrically isolates the first conductive portion and the first conductive portion;
wherein the mandrel is friction fit with the first conductive portion, and the mandrel is friction fit with the second conductive portion;
electronics electrically coupled to the first conductive portion and electrically coupled to the second conductive portion, the electronics transmit an electromagnetic wave from the first antenna structure;
a second antenna structure, the second antenna structure receives and re-transmits the electromagnetic wave transmitted from the first antenna structure.

21. The system as defined in claim 20 wherein the mandrel overlaps the first conductive portion for at least one foot, and the mandrel overlaps the second conductive portion for at least one foot.

* * * * *